United States Patent
Kreutzer et al.

(10) Patent No.: US 12,253,144 B2
(45) Date of Patent: Mar. 18, 2025

(54) METHOD FOR PRODUCING A THREADED NUT OF A THREADED DRIVE, IN PARTICULAR A BALL SCREW NUT OF A BALL SCREW DRIVE

(71) Applicant: Schaeffler Technologies AG & Co. KG, Herzogenaurach (DE)

(72) Inventors: Mario Kreutzer, Sonneberg (DE); Dieter Eckert, Fürth (DE); Paul Heinz, Forchheim (DE); Richard Baier, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 357 days.

(21) Appl. No.: 17/629,797

(22) PCT Filed: Jun. 25, 2020

(86) PCT No.: PCT/DE2020/100546
§ 371 (c)(1),
(2) Date: Jan. 25, 2022

(87) PCT Pub. No.: WO2021/018339
PCT Pub. Date: Feb. 4, 2021

(65) Prior Publication Data
US 2022/0260139 A1 Aug. 18, 2022

(30) Foreign Application Priority Data
Aug. 1, 2019 (DE) ...................... 10 2019 120 812.2

(51) Int. Cl.
*B21D 53/24* (2006.01)
*F16H 25/22* (2006.01)
*F16H 25/24* (2006.01)

(52) U.S. Cl.
CPC ......... *F16H 25/2204* (2013.01); *B21D 53/24* (2013.01); *F16H 2025/2481* (2013.01); *F16H 2025/249* (2013.01)

(58) Field of Classification Search
CPC ................. B21D 11/203; B21D 53/24; F16H 2025/2481; F16H 2025/249; F16H 25/2204
(Continued)

(56) References Cited

U.S. PATENT DOCUMENTS 1,923,514 A * 8/1933 Stockfleth ............... F16C 33/14
29/898.059
2,124,132 A * 7/1938 Bate ......................... B21K 1/04
29/898.058
(Continued)

FOREIGN PATENT DOCUMENTS

| CN | 1129469 A | 8/1996 |
| CN | 1533485 A | 9/2004 |

(Continued)

OTHER PUBLICATIONS

DE 10028968A1, Schneider Dec. 2001.*
(Continued)

*Primary Examiner* — Edward T Tolan
(74) *Attorney, Agent, or Firm* — Matthew V. Evans

(57) ABSTRACT

The disclosure relates to a method for producing a threaded nut of a threaded drive. In a forming process, a sleeve is produced from a steel sheet which is suitable for case-hardening. A flange is integrally formed on the sleeve for welding to a machine part. A welding surface of the flange has a diffusion-inhibiting layer which inhibits the penetration of carbon into the welding surface. The sleeve is case-hardened, and the welding surface is then exposed by removing the diffusion-inhibiting layer. The sleeve can be (Continued)

bonded to a machine part on the exposed welding surface of the sleeve.

15 Claims, 3 Drawing Sheets

(58) Field of Classification Search
USPC ...... 29/898.046, 898.047, 898.058, 898.059; 470/25
See application file for complete search history.

(56) References Cited

U.S. PATENT DOCUMENTS

| | | | | |
|---|---|---|---|---|
| 2,281,246 | A | * | 4/1942 | Peters ................. B23B 23/04 |
| | | | | 29/898.059 |
| 2,723,584 | A | | 11/1955 | Parker |
| 2,911,708 | A | * | 11/1959 | Fike ..................... C23C 28/02 |
| | | | | 29/527.3 |
| 3,199,173 | A | * | 8/1965 | Lefevre ................ F16C 33/14 |
| | | | | 72/348 |
| 3,375,563 | A | * | 4/1968 | Weinkamer .......... F16C 17/022 |
| | | | | 29/898.058 |
| 4,186,620 | A | | 2/1980 | Brusasco |
| 4,186,621 | A | | 2/1980 | Brusasco |
| 5,954,020 | A | | 9/1999 | Schmidt et al. |
| 6,116,109 | A | * | 9/2000 | Zernickel .......... F16H 25/2214 |
| | | | | 74/424.9 |
| 6,223,971 | B1 | | 5/2001 | Sato |
| 6,321,614 | B1 | | 11/2001 | Blaurock et al. |
| 6,644,903 | B1 | | 11/2003 | Arand |
| 8,220,353 | B2 | * | 7/2012 | Teramachi .......... F16H 25/2223 |
| | | | | 74/424.82 |
| 8,950,282 | B2 | * | 2/2015 | Babinski ............ F16H 25/2204 |
| | | | | 74/424.82 |
| 2007/0216277 | A1 | | 9/2007 | Yoshida et al. |
| 2013/0247701 | A1 | | 9/2013 | Kiforiuk et al. |
| 2015/0027270 | A1 | | 1/2015 | Flender et al. |
| 2017/0299028 | A1 | | 10/2017 | Kreutzer et al. |
| 2022/0205519 | A1 | | 6/2022 | Kreutzer et al. |

FOREIGN PATENT DOCUMENTS

| | | |
|---|---|---|
| CN | 208518997 U | 2/2019 |
| DE | 2929433 A1 | 1/1979 |
| DE | 102008014994 A1 | 9/2009 |
| DE | 102008054103 A1 | 5/2010 |
| EP | 0589580 A1 | 3/1994 |
| JP | H0751740 B2 | 6/1995 |
| JP | 2007113611 A | 5/2007 |
| JP | 2012224940 A | 11/2012 |
| JP | 2015232399 A | 12/2015 |
| WO | 0240895 A1 | 5/2002 |
| WO | 2005047735 A1 | 5/2005 |

OTHER PUBLICATIONS

Source: Author: Hai Jintao, Title: Advanced manufacturing technology, Source: Machinery Industry Press, 1st Edition, Dec. 1996, p. 596.

Author: Hay Ambrose, Title: "Simplified Design from the book material mechanics and 2006-05-31", Source:China water, Simplified Analysis, 1st edition, p. 180.

* cited by examiner

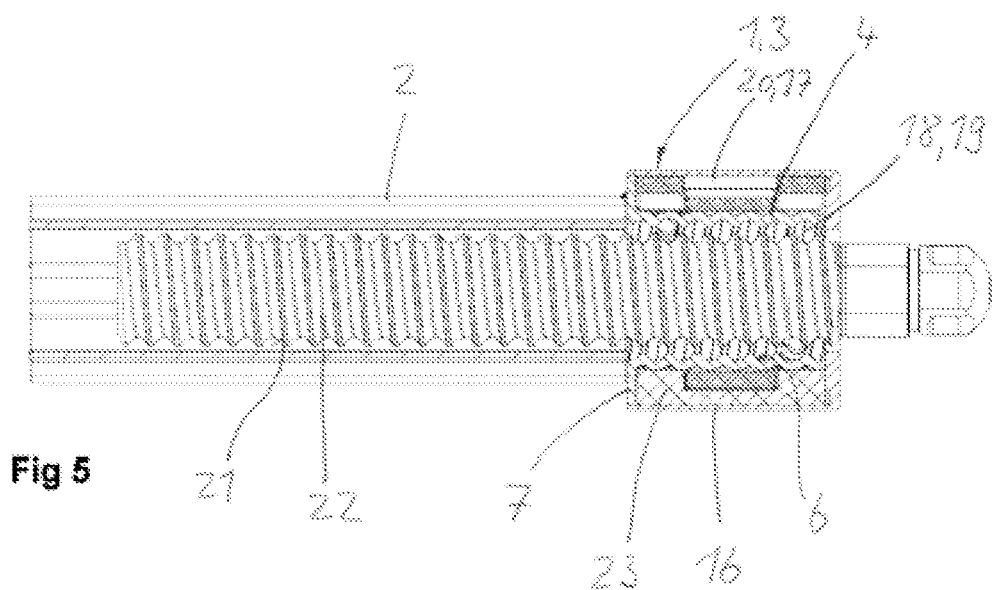

METHOD FOR PRODUCING A THREADED NUT OF A THREADED DRIVE, IN PARTICULAR A BALL SCREW NUT OF A BALL SCREW DRIVE

CROSS-REFERENCE TO RELATED APPLICATIONS

This application is the U.S. National Phase of PCT Application No. PCT/DE2020/100546 filed on Jun. 25, 2020, which claims priority to DE 2019 120 812.2 filed on Aug. 1, 2019, the entire disclosures of which are incorporated by reference herein.

TECHNICAL FIELD

The present disclosure relates to a method for producing a threaded nut of a threaded drive, in particular a ball threaded nut of a ball threaded drive.

BACKGROUND

A ball threaded nut of a ball threaded drive has been made known from DE2829433 A1, for example. The sleeve of the ball threaded nut formed from sheet steel is provided on its inner circumference with a ball groove which is wound helically around the axis of the ball threaded drive, and which is rolled in a forming process. The ball threaded nut is hardened.

Sheet steels with a low carbon content are suitable for machining without cutting, although they are often unsuitable for a hardening in a heat treatment method. For this reason, such sheet steels are carburized and the threaded nut formed from them is case-hardened. In many applications, depending on the application, a fixed connection between the threaded nut and a machine part is required. A welded connection is difficult or impossible due to the high carbon content or the martensitic structure.

The object of the disclosure is to provide a threaded nut of a threaded drive which can be produced in a metal forming process and, after hardening, can be connected to a machine part in a simple manner.

SUMMARY

According to the disclosure, this object was achieved by the profiled threaded nut described herein.

A method according to the disclosure for producing a threaded nut of a threaded drive provides for the following steps:

In a forming process, a sleeve is produced from a steel sheet which is suitable for case-hardening. Steel sheets with a low carbon content are suitable for machining without cutting.

The sleeve is provided with a welding section for welding to a machine part. In numerous applications it is necessary to materially connect the threaded nut to a machine part. The welding section provided for a material connection is made possible by the fact that a low-carbon steel is used to produce the sleeve. A radial flange formed onto the sleeve or an end face of the sleeve can serve as the welding section.

A welding surface of the welding section is provided with a diffusion-inhibiting layer which inhibits the penetration of carbon into the welding surface.

The diffusion-inhibiting layer can be formed by copper. This layer can be electroplated or plated on.

The layer can already be provided on one side of the starting material from which the sleeve is made. This layer can optionally also be applied to the welding section after the sleeve has been produced and before it is heat treated.

The sleeve can be provided on the outer circumference with the diffusion-inhibiting layer (10, 14) before the case-hardening, which is only removed in the region of the welding surface (9, 13) after the case-hardening. Removing the diffusion-inhibiting layer only in the area of the welding surface reduces the workload and ensures that the exposed welding surface is made available for welding to a machine part.

The diffusion-inhibiting layer may only be applied to the weld section after the sheet metal has been formed and before the case-hardening, and is removed after the case-hardening in the region of the welding surface. These method steps reduce the amount of material used.

A rolling profile for rolling contact with rolling elements is formed on the inner circumference of the sleeve in a forming process, which is wound helically around a longitudinal axis of the sleeve. All common forming methods are possible here, such as roller burnishing, high-pressure sheet metal forming and tumbling.

In the tumbling method, the sleeve is placed in a die, which is a stationary part of a tumbling press. A tumbling die is set in a rolling motion, under which the material of the sleeve can flow into its new shape and create a thread as a rolling profile.

The sleeve is case-hardened, wherein under the carburization the carbon penetrates in particular into the areas that serve as raceways for the balls. However, the diffusion-inhibiting layer on the welding surface inhibits the diffusion of carbon. After case-hardening, the welding surface is exposed by removing the diffusion-inhibiting layer and the threaded nut produced from the sleeve can be welded to a machine part.

This welding can take place independently of the manufacture of the threaded nut, i.e., if the threaded nut is supplied to a customer by the manufacturer of the threaded nut, for example, and is installed in the intended application.

Before the case-hardening, the sleeve can be provided with the diffusion-inhibiting layer on the outer circumference. This layer can also only be applied to the welding section. The sleeve prepared in this way can be case-hardened in the manner described. In the area of the rolling profile, a hardened surface is therefore produced which is suitable as a rolling surface for the balls.

Threaded nuts produced by the method according to the disclosure can be part of a ball threaded drive, the threaded nut of which is arranged on a threaded spindle, and the balls of which roll on ball grooves of the threaded nut and the threaded spindle that are helically wound around the longitudinal axis of the ball screw.

The threaded nut can have an outer sleeve, between which and the sleeve a deflection device, known per se, is provided for balls which circulate endlessly in a ball track. The ball track has a load section and a deflection section which endlessly connects a beginning and an end of the load section to one another. The load section is formed by ball grooves of the threaded nut and the threaded spindle that are helically wound around the spindle axis. In the case of what is termed a single deflection, the load section can be designed to be less than a full turn and in the case of an external deflection over several turns. The deflection device can have a plastic sleeve which is inserted coaxially between the sleeve and the outer sleeve. The flange described above extends between the sleeve and the outer sleeve and is firmly connected to the outer sleeve.

BRIEF DESCRIPTION OF THE DRAWINGS

The disclosure is explained in more detail below with reference to exemplary embodiments shown in two out of a total of five figures. In the figures:

FIG. 5 shows a ball threaded drive with a threaded nut according to FIG. 1.

DETAILED DESCRIPTION

In all figures, a threaded nut of a threaded drive according to the present disclosure is shown in the form of a ball threaded nut of a ball threaded drive.

Figure 1:
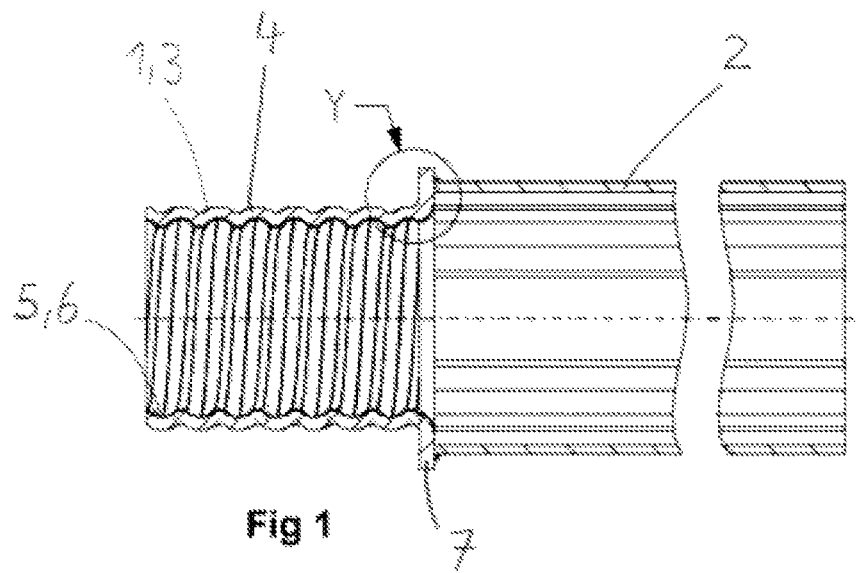
FIG. 1 shows a threaded nut designed as a ball threaded nut of a ball threaded drive in longitudinal section.

FIG. 1 shows in longitudinal section a threaded nut 1 of a threaded drive with a weld-on machine part 2 in longitudinal section. This threaded nut 1 is designed as a ball threaded nut 3. The ball threaded nut 3 has a sleeve 4 made of sheet steel, on the inner circumference of which a rolling profile 5 formed without cutting is configured for rolling contact with rolling elements, not shown. The rolling profile 5 is designed as a ball groove 6 which is helically wound around a longitudinal axis and on which rolling elements formed by balls, not shown, can roll.

The sleeve 4 is provided at one axial end with an integrally formed flange 7 for welding the machine part 2 on.

Figure 2:
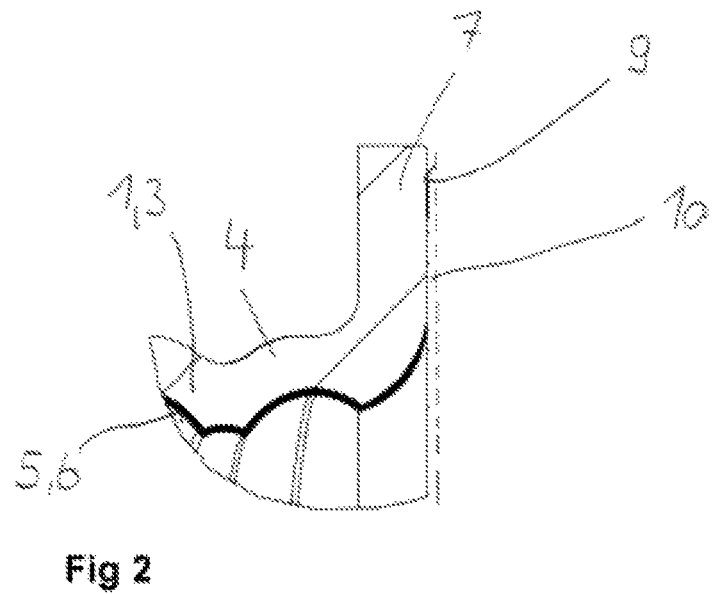
FIG. 2 shows an enlarged detail from FIG. 1.

FIG. 2 shows an enlargement of a section of the flange 7, which is provided with a welding surface 9 on its end face facing the machine part 2. This welding surface 9 is exposed after the sleeve 4 has been case-hardened.

In the course of the case-hardening, the sleeve 4 is carburized. The diffusion of carbon into the welding surface 9 is prevented by a diffusion-inhibiting layer 10, which is formed from copper in the exemplary embodiment. The hardened ball groove 6 is clearly shown in FIG. 2. After the case-hardening, the layer 10 is removed. The welding surface 9 underneath has not absorbed any carbon in the course of the case-hardening and can now be reliably connected to the machine part 2 in a materially bonded manner.

Figure 3:
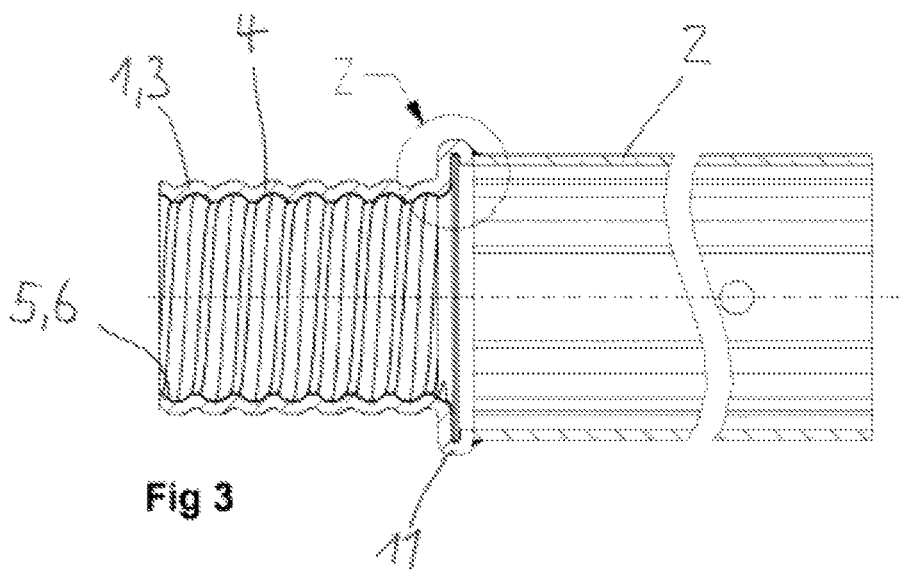
FIG. 3 shows another ball threaded nut in longitudinal section.
Figure 4:
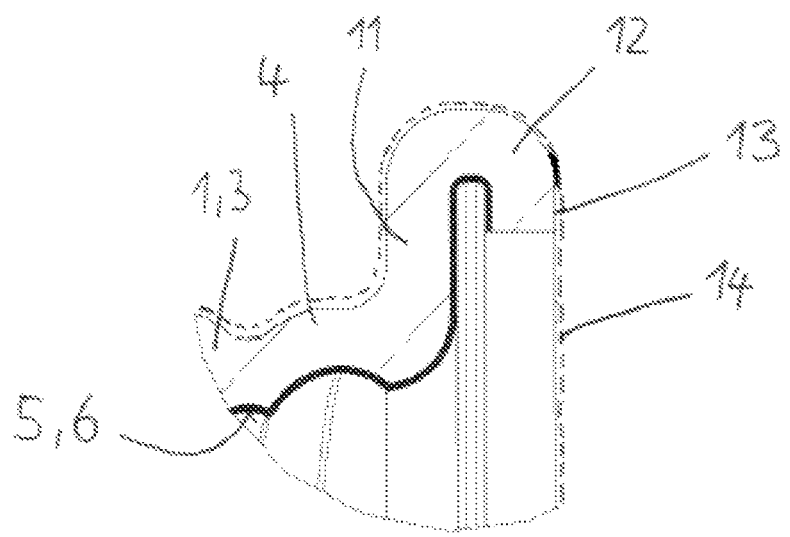
FIG. 4 shows an enlarged detail from FIG. 3.

The exemplary embodiment according to FIGS. 3 and 4 differs from that of FIGS. 1 and 2 only in that a flange 11 is integrally formed with the sleeve 4, the free end of which is provided with a flanging 12, the end face of which facing the machine part 2 is designed as a welding surface 13 and is welded to the machine part 2. The flanging 12 is materially connected to the machine part 2.

The sleeve 4 with the integrally formed flange 11 is provided on its outer lateral surface with a diffusion-inhibiting layer 14 which prevents the penetration of carbon when the sleeve 4 is case-hardened. After case-hardening has taken place, the ball groove is case-hardened and roll-proof.

The layer 14 can be removed on the end face facing the machine part 2, so that the welding surface 13 underneath is exposed for welding to the machine part 2. One variant provides for leaving the layer 14 on the welding surface during the welding process.

The steel sheet used to produce the threaded nut 1 can already be provided with the layer 14, which is formed from copper, for example. This layer 14 can be electroplated or plated on.

FIG. 5 shows a ball threaded drive with the threaded nut 1 designed as a ball threaded nut 3. The threaded nut 1 has an outer sleeve 16, between which and the sleeve 4 a deflection device 17, known per se, is provided for balls which circulate endlessly in a ball track 18. The ball track 18 has a load section 19 and a deflection section 20 which endlessly connects a beginning and an end of the load section 19 to one another. The load section 19 is formed by ball grooves 6, 21 of the threaded nut 1, wound or extending helically around the spindle axis, and one in the threaded spindle 22 on which the threaded nut 1 is arranged. In the exemplary embodiment, the threaded spindle 22 is driven in rotation. In this exemplary embodiment, the load section 19 extends over several turns. The deflection device 17 has a plastic sleeve 23 which is inserted coaxially between the sleeve 4 and the outer sleeve 16. The flange 7 described above extends radially between the sleeve 4 and the outer sleeve 16 and is firmly connected to the outer sleeve 16.

REFERENCE SYMBOLS

1 Threaded nut
2 Machine part
3 Ball threaded nut
4 Sleeve
5 Rolling profile
6 Ball groove
7 Flange
9 Welding surface
10 Layer
11 Flange
12 Flanging
13 Welding surface
14 Layer
16 Outer sleeve
17 Deflection device
18 Ball track
19 Load section
20 Deflection section
21 Ball groove
22 Threaded spindle
23 Plastic sleeve

The invention claimed is:

1. A method for producing a threaded nut of a threaded drive, the method comprising:
    forming a sleeve from a steel sheet, the steel sheet configured for case-hardening,
    forming a flange integrally with the sleeve, the flange having a welding surface configured for welding to a machine part,
    forming a rolling profile on an inner circumference of the sleeve, the rolling profile: i) configured for rolling contact with rolling elements; and, ii) extending helically around a longitudinal axis of the sleeve,
    applying a diffusion-inhibiting layer to at least a side of the flange facing the machine part, the diffusion-inhibiting layer configured to inhibit penetration of carbon into the welding surface, and
    case-hardening the sleeve.

2. The method according to claim 1, further comprising:
    removing at least a portion of the diffusion-inhibiting layer after the case-hardening so as to expose the welding surface.

3. The method according to claim 1, wherein the applying includes applying the diffusion-inhibiting layer to an outer circumference of the sleeve before the case-hardening.

4. The method according claim 1, wherein the applying includes only applying the diffusion-inhibiting layer to the flange after the sleeve has been formed.

5. The method according to claim 1, wherein the diffusion-inhibiting layer is formed by copper.

6. The method according to claim 1, wherein the diffusion-inhibiting layer is electroplated on the side facing the machine part.

7. The method according to claim 2, further comprising: welding the welding surface to the machine part after the removing.

8. The method according to claim 3, further comprising: removing a portion of the diffusion-inhibiting layer in a region of the welding surface after the case-hardening.

9. The method according to claim 8, further comprising: welding the welding surface to the machine part after the removing.

10. The method according to claim 4, further comprising: removing the diffusion-inhibiting layer in a region of the welding surface after the case-hardening.

11. The method according to claim 10, further comprising: welding the welding surface to the machine part after the removing.

12. A method for producing a threaded nut of a threaded drive, the method comprising:

providing a steel sheet having a diffusion-inhibiting layer, the diffusion-inhibiting layer configured to inhibit penetration of carbon during a case-hardening process of the steel sheet, forming a sleeve from the steel sheet, the diffusion-inhibiting layer arranged on an outer surface of the sleeve, forming a flange integrally with the sleeve, the flange having a welding surface covered by a portion of the diffusion-inhibiting layer, the welding surface configured for welding to a machine part, forming a rolling profile on an inner circumference of the sleeve, the rolling profile: i) configured for rolling contact with rolling elements, and ii) extending helically around a longitudinal axis of the sleeve, and case-hardening the sleeve.

13. The method according to claim 12, further comprising:

removing the portion of the diffusion-inhibiting layer covering the welding surface after the case-hardening.

14. The method according to claim 12, wherein the diffusion-inhibiting layer is formed by electroplating the steel sheet.

15. The method according to claim 12, wherein the diffusion-inhibiting layer is formed by copper.

* * * * *